US012752328B2

(12) United States Patent
Liu et al.

(10) Patent No.: US 12,752,328 B2
(45) Date of Patent: Oct. 6, 2026

(54) FLATTENING DEVICE

(71) Applicant: CONTEMPORARY AMPEREX TECHNOLOGY (HONG KONG) LIMITED, Hong Kong (CN)

(72) Inventors: Xuyong Liu, Ningde (CN); Jingjing Pu, Ningde (CN); Hongwu Shang, Ningde (CN); Shisong Li, Ningde (CN); Shengwu Zhang, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 311 days.

(21) Appl. No.: 18/601,998

(22) Filed: Mar. 11, 2024

(65) Prior Publication Data

US 2024/0207915 A1 Jun. 27, 2024

Related U.S. Application Data

(63) Continuation of application No. PCT/CN2022/102209, filed on Jun. 29, 2022.

(30) Foreign Application Priority Data

May 12, 2022 (CN) ......................... 202221128220.9

(51) Int. Cl.
*B21D 1/02* (2006.01)
*B21D 37/04* (2006.01)
*H01M 4/04* (2006.01)

(52) U.S. Cl.
CPC ............... *B21D 1/02* (2013.01); *B21D 37/04* (2013.01); *H01M 4/0435* (2013.01)

(58) Field of Classification Search
CPC ............................. B21D 33/00; H01M 4/0435
See application file for complete search history.

(56) References Cited

U.S. PATENT DOCUMENTS

| | | | | |
|---|---|---|---|---|
| 12,415,215 B2 * | 9/2025 | Tang | ..................... | B21B 27/021 |
| 2023/0411670 A1 * | 12/2023 | Xie | ..................... | H01M 4/0433 |
| 2025/0015252 A1 * | 1/2025 | Lee | ........................... | B65C 9/32 |
| 2025/0038165 A1 * | 1/2025 | Kim | ........................ | H01M 4/04 |

(Continued)

FOREIGN PATENT DOCUMENTS

| | | |
|---|---|---|
| CN | 202924451 U | 5/2013 |
| CN | 204809311 U | 11/2015 |

(Continued)

OTHER PUBLICATIONS

Translation of CN-212558741-U (Year: 2021).*

(Continued)

*Primary Examiner* — Jacob J Cigna
(74) *Attorney, Agent, or Firm* — ANOVA LAW GROUP, PLLC

(57) ABSTRACT

A flattening device includes a main roller and a plurality of sleeves. The plurality of sleeves are sleeved on the main roller at intervals in an axial direction of the main roller. At least one of the sleeves is detachably connected to the main roller, so that positions of the sleeves in the axial direction of the main roller are adjustable, and the sleeves are in contact with the electrode plate to flatten the electrode plate when the electrode plate passes through the sleeves.

13 Claims, 10 Drawing Sheets

(56) References Cited

U.S. PATENT DOCUMENTS

| | | | | |
|---|---|---|---|---|
| 2025/0205764 | A1* | 6/2025 | Jeong | B30B 3/00 |
| 2025/0372605 | A1* | 12/2025 | Shin | H01M 4/0435 |

FOREIGN PATENT DOCUMENTS

| | | | | | |
|---|---|---|---|---|---|
| CN | 204898060 | U | | 12/2015 | |
| CN | 205701355 | U | | 11/2016 | |
| CN | 207149624 | U | | 7/2017 | |
| CN | 107068968 | A | * | 8/2017 | H01M 10/0525 |
| CN | 108405717 | A | | 8/2018 | |
| CN | 207695365 | U | | 8/2018 | |
| CN | 208008135 | U | | 10/2018 | |
| CN | 110723493 | A | * | 1/2020 | B65G 39/06 |
| CN | 211545388 | U | | 9/2020 | |
| CN | 212558741 | U | * | 2/2021 | |
| CN | 213150811 | U | * | 5/2021 | B21D 1/02 |
| CN | 214927324 | U | | 11/2021 | |
| CN | 215266365 | U | * | 12/2021 | |
| CN | 114348739 | A | | 4/2022 | |
| KR | 20200121502 | A | | 10/2020 | |

OTHER PUBLICATIONS

Translation of CN-213150811-U (Year: 2021).*
Translation of CN-107068968-A (Year: 2017).*
Translation of CN-215266365-U (Year: 2021).*
The World Intellectual Property Organization (WIPO) International Search Report for PCT/CN2022/102209 Jan. 18, 2023 6 Pages (including translation).

* cited by examiner

FLATTENING DEVICE

CROSS REFERENCE TO RELATED APPLICATIONS

This application is a continuation of International application No. PCT/CN2022/102209, filed on Jun. 29, 2022, which claims priority to Chinese Patent Application No. 202221128220.9, titled "FLATTENING DEVICE" and filed on May 12, 2022, the entire contents of both of which are incorporated herein by reference.

TECHNICAL FIELD

The present application relates to the technical field of battery, and in particular to a flattening device.

BACKGROUND

A Battery is an important device for storing electrical energy. An electrode plate is an important component of a lithium battery. During production, a slurry containing an electrode active material can coat on one or two sides of the electrode plate, so that the electrode plate can be divided into a film-coating region and a blank region (electrode tab region). Herein, a portion coated with the electrode active material may be the film-coating region, and a portion not coated with the electrode active material may be the blank region.

During a transmission process of all process steps (coating, rolling, winding and the like), the electrode plate is prone to wrinkle, so that it may affect the yield of the electrode plate.

SUMMARY

A flattening device is provided by embodiments of the present application, which can flatten the wrinkle of an electrode plate and improve the yield of the electrode plate.

The flattening device provided by embodiments of the present application may include a main roller and a plurality of sleeves. The plurality of sleeves are sleeved on the main roller at intervals in an axial direction of the main roller. At least one of the sleeves is detachably connected to the main roller, so that positions of the sleeves in the axial direction of the main roller are adjustable, and the sleeves are in contact with the electrode plate to flatten the electrode plate when the electrode plate passes through the sleeves.

The electrode plate can be flattened and wrinkled through the sleeves, so that it can improve the yield of the electrode plate. The sleeves can be detachably connected to the main roller, the electrode plate can be flattened using the main roller alone, or the sleeves can be sleeved on the main roller for flattening. The sleeves can flatten both a film-coating region and a blank region. By sleeving the plurality of sleeves at intervals in the axial direction of the main roller, it can be applied to the electrode plate with a plurality of blank regions and a plurality of film-coating regions, and simultaneously it can flatten the plurality of film-coating regions or blank regions. A distance between any two sleeves can be adjusted, and the distance between sleeves can be adjusted. The distance between the sleeves can be adjusted according to a width between the blank regions or the film-coating regions, so that different types of the electrode plates can be flattened, so as to improve the compatibility of the flattening device.

In some embodiments, at least two sleeves have different dimensions in the axial direction, and corresponding sleeves can be selected based on the width of the film-coating region or blank region which is flattened as needed; and/or, at least two sleeves have different surface patterns, and the sleeves with the corresponding surface patterns can be selected based on the specific wrinkling situations, so as to improve an application scope of the flattening device.

In some embodiments, at least one of the sleeves may include a sleeve main body and a first protruding part, the sleeve main body can be sleeved on the main roller and detachably connected to the main roller, and the first protruding part protrudes from an outer surface of the sleeve main body. The arrangement of the first protruding part can increase a frictional force between the sleeves and the electrode plate, so as to improve the flattening effect.

In some embodiments, a plurality of first protruding parts can be provided, and the plurality of first protruding parts are arranged at intervals in a circumferential direction of the sleeve main body. When the main roller drives the sleeves to rotate, since the plurality of first protruding parts are arranged at intervals in the circumferential direction, each of the plurality of first protruding parts can be in contact with the electrode plate, so that the force on the electrode plate can be more uniform.

In some embodiments, the first protruding part can extend in the axial direction. A contact area between the first protruding parts and the electrode plate is large, so that it can improve the wrinkle-removing effect.

In some embodiments, an extending direction of the first protruding part is inclined relative to the axial direction. If there is a difference in height between two sides of the electrode plate in a width direction thereof, or if thicknesses of the film-coating region of the electrode plate are inconsistent, it will lead to an offset phenomenon during the electrode plate moving. The sleeves with the first protruding part whose extending direction is inclined relative to the axial direction of the main roller can not only achieve the wrinkle-removing and flattening effect, but also have a certain deflection-correcting effect on the electrode plate, so that the electrode plate can move in a predetermined direction.

In some embodiments, an inclined angle of the extending direction of the first protruding part relative to the axial direction is in a range of 1°-80°. If the inclined angle of the extending direction of the first protruding part relative to the axial direction of the main roller is too small, the deflection-correcting effect may not be obvious; if the inclined angle of the extending direction of the first protruding part relative to the axial direction of the main roller is too large, the excessive deflection-correcting effect may occur. Therefore, the inclined angle can be selected from 1° to 80°, so that it cannot only ensure the deflection-correcting effect on the electrode plate that has moved and offset, but also avoid the phenomenon that the electrode plate offsets again due to the excessive deflection-correcting effect.

In some embodiments, the first protruding part extends in a spiral shape. The helical first protruding part also has direction guidance for the electrode plate, so that it can achieve the deviation-correcting effect.

In some embodiments, the flattening device may include two sleeves. Extending directions of the first protruding parts of the two sleeves are arranged at an angle, and the two sleeves are symmetrically sleeved on the main roller. The inclination directions of the first protruding parts of the two sleeves may be opposite to each other, and the forces exerted by the first protruding parts of the two sleeves on the electrode plate is exactly opposite to each other, so that it can prevent the electrode plate from offsetting during movement and cause the electrode plate to move in the predetermined direction.

In some embodiments, at least one of the sleeves may include at least two arc segments sequentially distributed in the axial direction, the at least two arc segments are protruded, and an outer surface of each of the arc segments is an arc surface with the same curvature. The plurality of arc segments protruding outward can increase the friction force between the sleeves and the electrode plate, thereby improving the flattening effect.

In some embodiments, at least one of the sleeves may include a first segment and a second segment sequentially distributed in the axial direction, the first segment and the second segment are arranged to gradually expand toward directions close to each other respectively, and the sleeves are sleeved on a middle region of the main roller. Since the electrode plate is relatively thin, during the movement of the electrode plate, the electrode plate is generally in a state that is high on two sides and depressed downward in the middle during the movement of the electrode plate, so that it is prone to wrinkle. The sleeves can be arranged in the middle region of the main roller, corresponding to the region depressed downward in the middle of the electrode plate. Since at least one of the sleeves may be in a shape which is high in the middle and low at two ends, the sleeves can lift up a depressed portion of the electrode plate, so as to prevent the electrode plate from wrinkling.

In some embodiments, the sleeves may be elastic sleeves. The elastic sleeves not only have the advantage of light weight, but also have a certain degree of flexibility, so that it can protect the electrode plate and prevent the electrode plate from being damaged.

In some embodiments, the main roller may include a roller body and a plurality of second protruding parts, each of the second protruding parts may protrude from an outer surface of the roller body, and an inner surface of at least one of the sleeves may be provided with grooves engaged with the second protruding parts. By the engagement cooperation between the second protruding parts and the grooves, the sleeves can be sleeved on the outer surface of the main roller, and the sleeves can slide relative to the main roller to realize the position adjustment of the sleeves.

In some embodiments, the flattening device may further include an expansion structure arranged between the main roller and the sleeves. The main roller can be detachably connected to the sleeves through the expansion structure. The sleeves can be tightly sleeved on the main roller through the expansion of the expansion structure. When it is needed to adjust the position of the sleeves or disassemble the sleeves, only the pressure relief of the expansion structure is needed to form a gap between the sleeves and the main roller, and the sleeves and the main roller can be separated from each other.

The above description is only an overview of the technical solution of the present application. In order to have a clearer understanding of the technical solution of the present application, it can be implemented according to the content of the description, and in order to make the above and other purposes, features and advantages of the present application more obvious and understandable, the specific embodiments of the present application will be listed below.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without the inventive labor.

Figure 1:
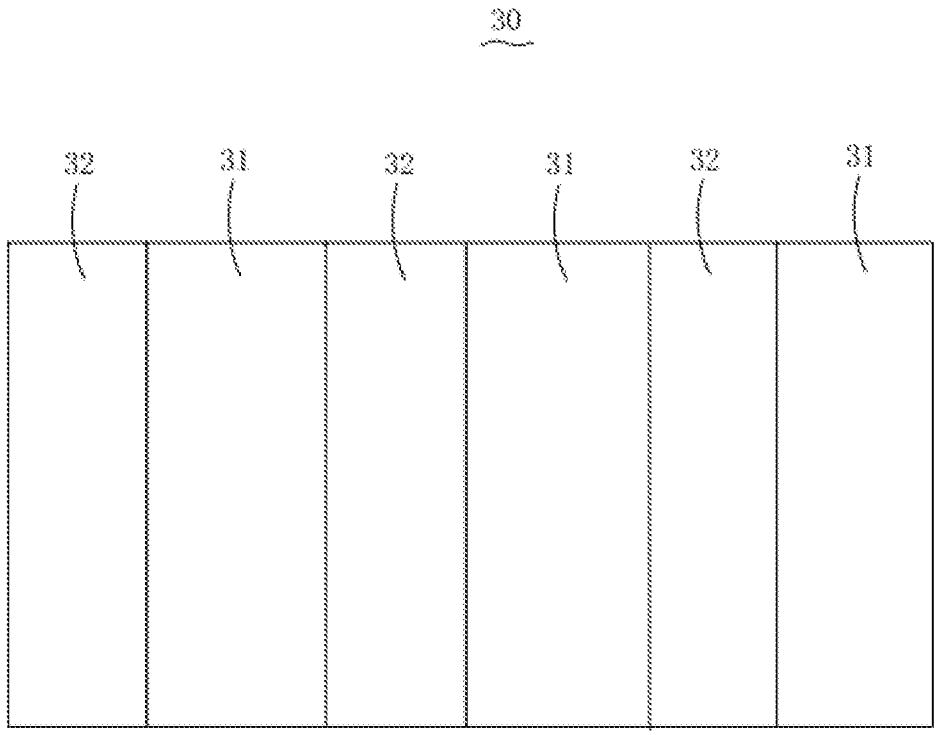
FIG. 1 shows a structural schematic view of an electrode plate according to some embodiments of the present application.

In the drawings: 100—flattening device; 10—main roller; 11—roller body; 12—second protruding part; 20—sleeve; 21—sleeve main body; 22—first protruding part; 23—arc segment; 24—first segment; 25—second segment; 26—groove; 30—electrode plate; 31—film-coating region; 32—blank region.

DETAILED DESCRIPTION

The embodiments of the present application will be described in further detail below conjunction with the drawings and the embodiments. The detailed description and drawings of the following embodiments are used to exemplarily illustrate the principle of the present application, but cannot be used to limit the scope of the present application, in other words, the present application is not limited to the described embodiments.

In the description of the present application, it should be noted that, unless otherwise specified, "plurality" means more than two; the terms "upper", "lower", "left", "right", "inner", "outer", etc. indicate the orientation or positional relationship only for the convenience of describing the present application and simplifying the description, rather than indicating or implying that the device or the element referred to must have a specific orientation, be configured and operated in a specific orientation, and therefore cannot be understood as a limitation of the present application. In addition, the terms "first", "second", "third", etc. are only used for descriptive purposes, and cannot be understood as indicating or implying relative importance. The term "perpendicular" does not mean strictly perpendicular, but within the allowable range of error. The term "parallel" does not mean strictly parallel, but within the allowable range of error.

The orientation words appearing in the following description are all directions shown in the drawings, and do not limit the specific structure of the present application. In the description of the present application, it should also be noted that, unless otherwise clearly specified and limited, the terms "installed", "connecting" and "connected" should be understood in a broad sense, for example, it can be a fixed connection, a detachable connection, or an integral connection, it can be a direct connection, or it can be connected indirectly through an intermediary. For those of ordinary skill in the art, the specific meaning of the above-mentioned terms in the present application can be understood according to specific situations.

At present, based on the development of the market situation, the application of a power battery is becoming increasingly widespread. The power battery is not only used in an energy storage power system such as a hydropower, firepower, wind power or solar power plant and the like, but also widely used in an electric vehicle such as an electric bicycle, an electric motorcycle, an electric vehicle and the like, as well as in various fields such as military equipment, aerospace and the like. With the continuous expansion of the application field of the power battery, the market demand thereof is also constantly expanding.

A battery, such as a lithium ion secondary battery, a lithium ion primary battery, a lithium sulfur battery, a sodium lithium ion battery, a sodium-ion battery or a magnesium ion battery, has the advantages of high energy density, high power density, more recycling times, long storage time, etc., and has been widely used in an electric-consuming apparatus suitable for the battery. For example, the electric-consuming apparatus can be a vehicle, a mobile phone, a portable device, a laptop, a ship, a spacecraft, an electric toy, an electric tool and so on. The vehicle can be a fuel powered vehicle, a gas powered vehicle or a new energy vehicle. The new energy vehicle can be a pure electric vehicle, a hybrid electric vehicle, an extended range vehicle or the like; the spacecraft may include an airplane, a rocket, a space shuttle, a spaceship and the like; the electric toy may include a fixed electric toy or a mobile electric toy, such as a game machine, an electric car toy, an electric boat toy, an electric aircraft toy and the like; the electric tool may include a metal cutting electric tool, a grinding electric tool, an assembly electric tool and a railway electric tool, such as an electric drill, an electric bench grinder, an electric wrench, an electric screwdriver, an electric hammer, an impact drill, a concrete vibrator and an electric planer and the like.

In the production process of the battery, an electrode plate of the battery needs to go through processes such as coating, rolling, drying, cutting and the like. During production, the electrode plate will be coated with a slurry containing electrode active material on one or two sides of the electrode plate, so that the electrode plate can be divided into a film-coating region and a blank region (electrode tab region). A portion coated with the electrode active material is the coating region, while a portion not coated with the electrode active material is the blank region. The inventor notes that the electrode plate needs to go through a plurality of process devices from an unwinding device to a winding device. During this process, wrinkle may be generated on the electrode plate, which may affect the normal process of a forming process of the electrode-sheet and reduce the yield of the electrode plate. In order to alleviate the problem of wrinkles during the electrode plate forming process, it is needed to flatten the electrode plate in a timely manner during the production process. The inventor arranges a flattening device for the electrode plate at an appropriate position in the electrode plate forming process (such as a position where the electrode plate is prone to wrinkle). A friction force generated by the flattening device on the electrode plate is eliminated to eliminate wrinkles formed on the electrode plate, so that it can ensure the smooth progress of the electrode plate forming process and effectively improve the yield of the electrode plate.

The flattening device in a related art generally eliminates the wrinkle caused by the shrinkage of the electrode plate by pasting Teflon on a passing roller at a wrinkle-removing position, and eliminates the wrinkle caused by the stress concentration in the blank region through a curved flattening roller. However, the inventor finds that the flattening roller can only flatten the same model of electrode plate, and the wrinkle-removing position on the flattening roller is fixed. However, the widths of the film-coating region and blank region of different types of electrode plates are different, and the position that needs to remove the wrinkle will be also changed, so that it cannot be applied to different types of electrode plates.

In order to solve the problem that different types of the electrode plates cannot be flattened because the wrinkle-removing position of the flattening device cannot be changed, the inventor has designed a flattening device through in-depth research. By detachably connecting a sleeve to a main roller, the electrode plates can be flattened using the main roller alone, or the sleeve can be placed on the main roller to flatten the electrode plates. The sleeve can flatten both the film-coating film and the blank region. On the other hand, the position of the sleeve on the main roller can be adjusted in an axial direction of the main roller, and a plurality of sleeves can be arranged at intervals in the axial direction of the main roller, so that it can be applied to the electrode plates with a plurality of blank regions and a plurality of film-coating regions, while flattening the plurality of film-coating regions or the plurality of blank regions. Since a distance between any two sleeves can be adjusted, the distance between the sleeves can be adjusted according to the width between the blank regions or the film-coating regions, so as to flatten different types of electrode plates, so that the compatibility of the flattening device can be improved The flattening device described in embodiments of the present application is applicable to an electrode plate flattening device and the electrode plate forming device using the electrode plate flattening device.

The flattening device described in the embodiments of the present application can be used to, but not limited to, flatten the electrode plate, and can also be used to flatten other strip components, such as a separator.

FIG. 1 shows a structural schematic view of an electrode plate 30 according to some embodiments of the present application. The electrode plate 30 includes a film-coating region 31 and a blank region 32 arranged at intervals, the film-coating region 31 is coated with an electrode active material, and the blank region 32 is not coated with the electrode active material.

Figure 2:
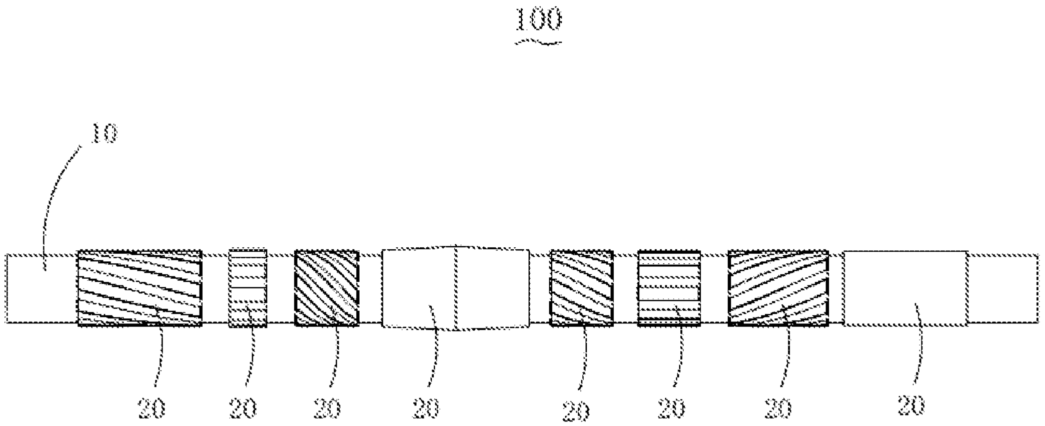
FIG. 2 shows a structural schematic view of a flattening device according to some embodiments of the present application.

According to some embodiments of the present application, referring to FIG. 2, FIG. 2 shows a structural schematic view of a flattening device 100 according to some embodiments of the present application. The flattening device 100 provided by embodiments of the present application may include a main roller 10 and a plurality of sleeves 20. The plurality of sleeves 20 are sleeved on the main roller 10 at intervals in an axial direction of the main roller 10. At least one of the sleeves 20 is detachably connected to the main roller 10, so that positions of the sleeves 20 in the axial direction of the main roller 10 are adjustable, and the sleeves 20 are in contact with the electrode plate 30 to flatten the electrode plate 30 when the electrode plate 30 passes through the sleeves 20.

The length of the main roller 10 is greater than the length of the sleeve 20. The main roller 10 can be used as an active roller with a servo motor or can be separately assembled as a driven roller. The main roller 10 can rotate to drive the sleeves 20 sleeved on the main roller 10 to rotate. The electrode plate 30 can be in contact with the rotating sleeves 20 during a transmission process.

Figure 3:
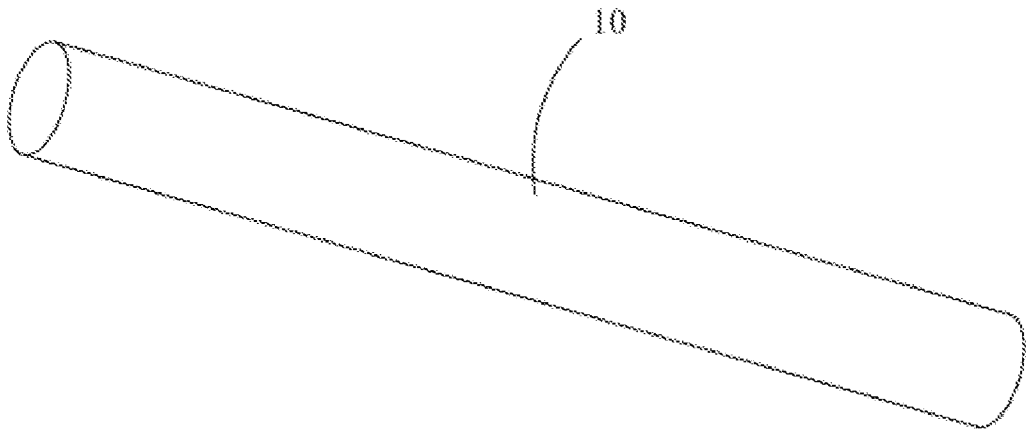
FIG. 3 shows a structural schematic view of a main roller according to some embodiments of the present application.
Figure 4:
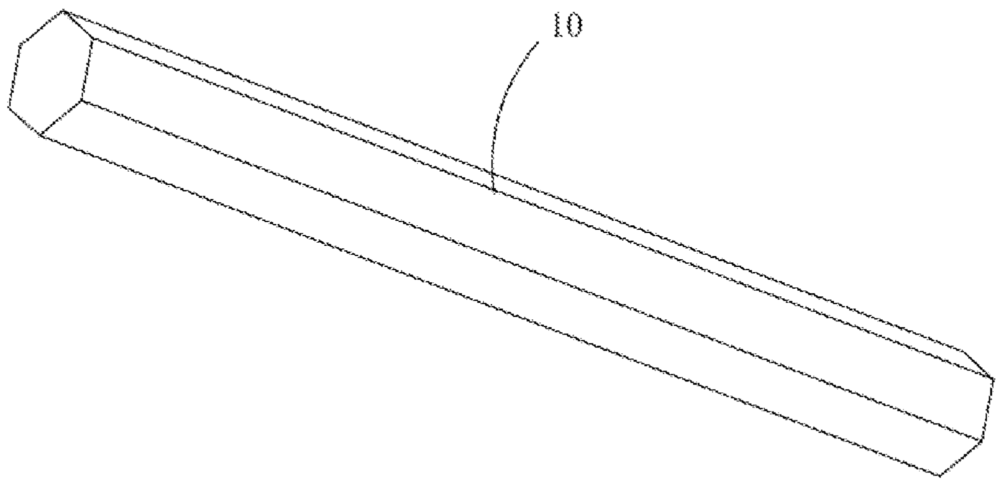
FIG. 4 shows a structural schematic view of a main roller according to some other embodiments of the present application.

Referring to FIG. 3 and FIG. 4, FIG. 3 shows a structural schematic view of the main roller 10 according to some embodiments of the present application; FIG. 4 shows a structural schematic view of the main roller 10 according to some other embodiments of the present application. The main roller 10 can be a cylindrical roller as shown in FIG. 3 or a prism roller as shown in FIG. 4. When the main roller 10 is the prismatic roller, it can prevent the sleeves 20 from rotating relative to one another after being sleeved on an outer side of the main roller 10. In addition, the main roller 10 can also be an arc-shaped roller. When the main roller 10 is the cylindrical roller or the arc-shaped roller, the main roller 10 can be used separately to flatten the film-coating region 31 of the electrode plate 30.

Due to the active material coating on the film-coating region 31, a thickness of the film-coating region 31 is larger than a thickness of the blank region 32. The sleeves 20 are sleeved on an outer side of the main roller 10, so the sleeves 20 protrude outward relative to the main roller 10. The sleeves 20 can flatten the blank region 32 which is concave relative to the film-coating region 31. Of course, the sleeves 20 can also be used to flatten the film-coating region 31. Since the sleeves 20 can be disassembled arbitrarily, the quantity and the position of the sleeves 20 fixed on the main roller 10 can be determined as required. If it is needed to remove the wrinkle and flatten the blank region 32 or the film-coating region 31, it is enough to select the sleeves 20 sleeved on the main roller 10.

It can be understood that some electrode plates 30 have the plurality of blank regions 32 or film-coating regions 31. The widths of the blank regions 32 or film-coating regions 31 of different types of electrode plates 30 are different, resulting in different spacing distances between two blank regions 32 or different spacing distances between two film-coating regions 31. If the plurality of blank regions 32 or the plurality of film-coating regions 31 need to remove the wrinkle, the corresponding number of sleeves 20 can be selected to be sleeved on the main roller 10 in the axial direction of the main roller 10. Moreover, the spacing distance between the sleeves 20 can be adjusted, so that the sleeves 20 can respectively correspond to the blank regions 32 or the film-coating regions 31 that need to remove the wrinkle.

The plurality of sleeves 20 can also be continuously sleeved on the main roller 10. That is to say, there is no spacing distance between the sleeves 20, so as to flatten and remove the wrinkle from the blank region 32 or the film-coating region 31 of the electrode plate 30.

In the technical solution of the present application embodiment, by detachably connecting the sleeve 20 with the main roller 10, the main roller 10 can be used separately to flatten the electrode plate 30, or the sleeve 20 can be sleeved on the main roller 10 to flatten the electrode plate 30. The sleeve 20 can flatten both the film-coating region 31 and the blank region 32. On the other hand, the position of the sleeve 20 in the axial direction of the main roller 10 can be adjusted, and the plurality of sleeves 20 can be sleeved at intervals in the axial direction of the main roller 10, the sleeves 20 can be applied to the electrode 30 with the plurality of blank regions 32 and the plurality of film-coating regions 31, and at the same time can flatten the plurality of film-coating regions 31 or blank regions 32. Since the distance between any two sleeves 20 can be adjusted, the distance between sleeves 20 can be adjusted according to the width between the blank regions 32 or the film-coating regions 31, so as to flatten different types of electrode plates 30, thereby improving the compatibility of the flattening device 100.

At least two sleeves 20 have different axial dimensions; and/or at least two sleeves 20 have different surface patterns.

In some embodiments, at least two sleeves 20 have different dimensions in the axial direction. Due to differences in the widths of different film-coating regions 31 or the blank regions 32 on the same electrode plate 30, or differences in the widths of film-coating regions 31 or the blank regions 32 of different types of the electrode plates 30, the dimensions of the at least two sleeves 20 in the axial direction of the main roller 10 can be set differently, that is, the length dimensions of the at least two sleeves 20 are different. The sleeves 20 with corresponding length dimensions can be selected based on the specific widths of the film-coating regions 31 or the blank regions 32, so that it can improve the application scope of the flattening device 100.

Figure 5:
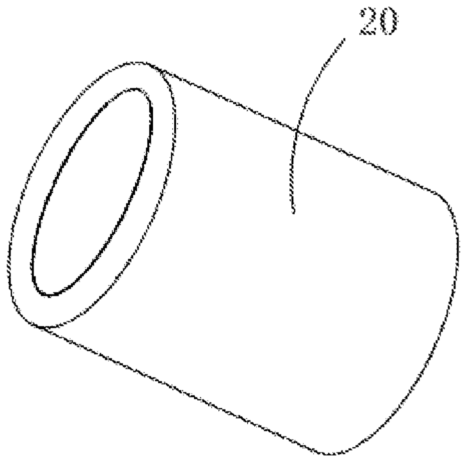
FIG. 5 shows a structural schematic view of a sleeve according to some embodiments of the present application.
Figure 6:
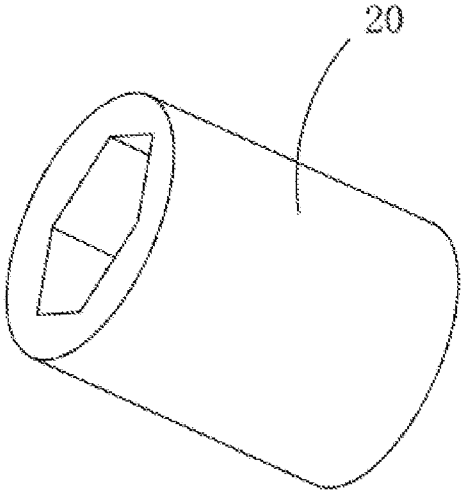
FIG. 6 shows a structural schematic view of a sleeve according to some other embodiments of the present application.

In some embodiments, at least two sleeves 20 have different surface patterns. FIG. 5 shows a structural schematic view of the sleeve 20 according to some embodiments of the present application; FIG. 6 shows a structural schematic view of the sleeve 20 according to some other embodiments of the present application. The sleeve 20 can be a cylindrical sleeve as shown in FIG. 5 and FIG. 6, or an arc-shaped sleeve. The outer surface of sleeve 20 can be smooth face or formed the pattern, so as to increase the friction force between sleeve 20 and electrode plate 30 and improve the wrinkle-removing effect. Different patterns can correspond to different wrinkle situations. The patterns on the outer surfaces of at least two sleeves 20 are arranged to be different, so that it can flatten the electrode plates 30 in the different wrinkled situations and improve the application scope of the flattening device 100.

In some other embodiments, the dimensions of at least two sleeves 20 in the axial direction are different, and at least two sleeves 20 have different surface patterns. It can not only flatten the film-coating regions 31 or the blank regions 32 with different widths, but also be suitable for removing the wrinkle in different situations, so that it can meet different flattening requirements.

Figure 7:
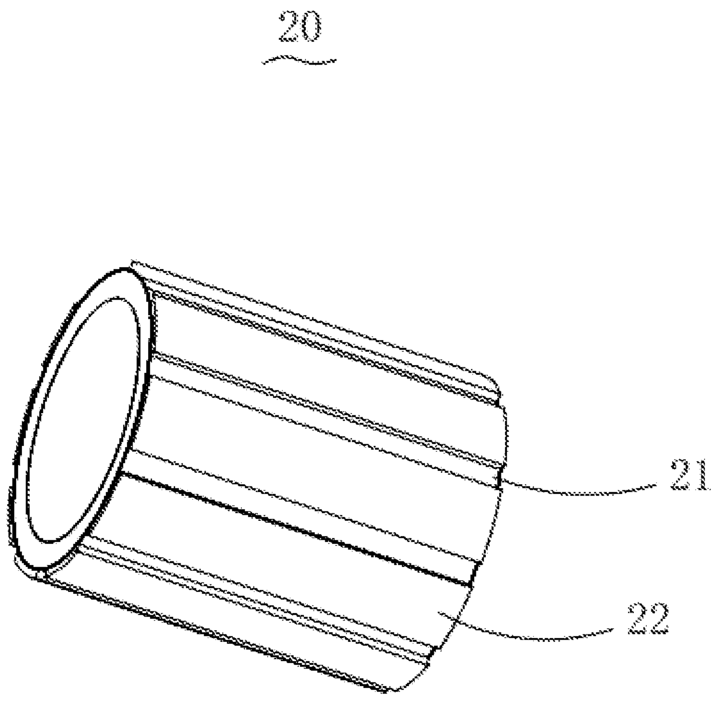
FIG. 7 shows a structural schematic view of a sleeve according to some other embodiments of the present application.

Referring to FIG. 7, FIG. 7 shows a structural schematic view of the sleeve 20 according to some other embodiments of the present application. At least one of the sleeves 20 may include a sleeve main body 21 and a first protruding part 22, the sleeve main body 21 can be sleeved on the main roller 10 and detachably connected to the main roller 10, and the first protruding part 22 may protrude from an outer surface of the sleeve main body 21.

An inner wall of the sleeve main body 21 can be in contact with an outer wall of the main roller 10 to achieve fixing the sleeves 20. The first protruding part 22 may protrude outward from the sleeve main body 21. When the electrode plate 30 passes through the flattening device 100, the first protruding part 22 is in contact with the electrode plate 30. The first protruding part 22 can be a point-shaped protruding structure or a long strip-shaped convex rib structure. A portion of the outer surface of the sleeve main body 21 may be arranged as a convex curved surface to form the first protruding part 22, or the outer surface of the sleeves 20 may be arranged as a concave dent to form the first protruding part 22.

The arrangement of the first protruding part 22 can increase the frictional force between the sleeves 20 and the electrode plate 30, so as to improve the flattening effect.

In some embodiments, a plurality of first protruding parts 22 can be provided, and the plurality of first protruding parts 22 are arranged at intervals in a circumferential direction of the sleeve main body 21.

The first protruding parts 22 can be evenly arranged on an outer circumference of the sleeve main body 21 at intervals. The spacing distance between the first protruding parts 22 can be determined as needed. The dense arrangement of the first protruding parts 22 is more conducive to increasing the wrinkle-removing effect. The first protruding parts 22 can also be detachably fixed to the sleeve main body 21 to adjust the spacing distance between the first protruding parts 22. For example, a groove can be formed on the outer surface of the sleeve main body 21, and the first protruding parts 22 can be engaged with the groove to achieve sliding the first protruding parts 22 in the groove. By sliding the first protruding part 22 along the groove, the distance between the two first protruding parts 22 can be adjusted. It is also possible to set the number of first protruding parts 22 on the sleeve main body 21 as needed to adjust the friction force between the sleeves 20 and the electrode plate 30.

When the main roller 10 drives the sleeves 20 to rotate, since the plurality of first protruding parts 22 are arranged at intervals in the circumferential direction, each of the plurality of first protruding parts 22 can be in contact with the electrode plate 30, so that it not only can increase the frictional force between the sleeve 20 and the electrode plate 30, but also can make the force on the electrode plate 30 more uniform, thereby improving the wrinkle-removing effect and flattening effect.

Figure 8:
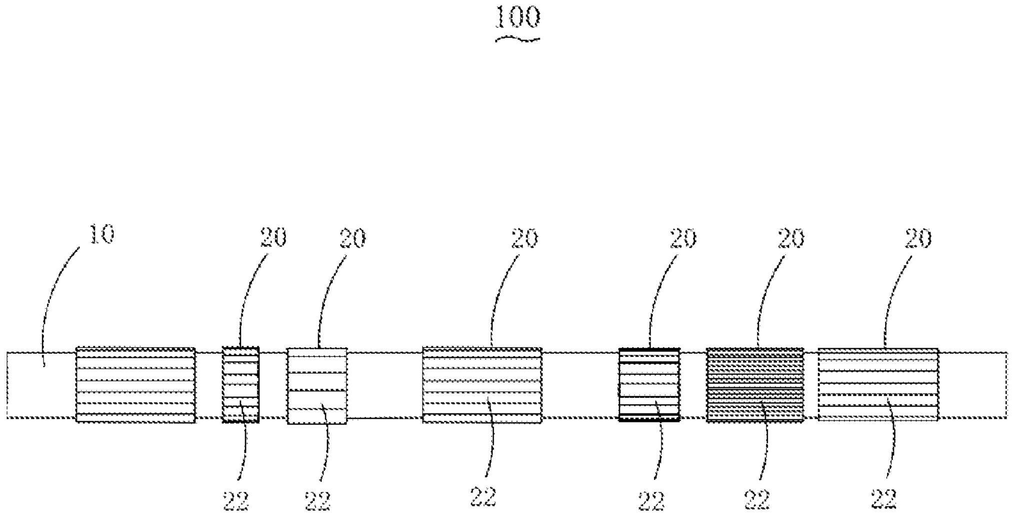
FIG. 8 shows a structural schematic view of a flattening device according to some other embodiments of the present application.

FIG. 8 shows a structural schematic view of the flattening device 100 according to some other embodiments of the present application. The first protruding parts 22 can extend in the axial direction. An extending direction of the first protruding parts 22 is the same as an extending direction of the main roller 10. That is, each of the first protruding parts 22 may be a vertical convex rib structure that extends in the axial direction of the main roller 10. When flattening the electrode plate 30 and removing the wrinkle, the axial direction of the main roller 10 can be consistent with the width direction of the electrode plate 30. The contact area between the electrode plate 30 and the first protruding parts 22 is large. In the width direction of the electrode plate 30, a portion where the electrode plate 30 is in contact with the first protruding parts 22 can achieve wrinkle removal.

In this embodiment, the contact area between the first protruding parts 22 and the electrode plate 30 is large, so that it can improve the wrinkle-removing effect. In addition, when the electrode plate 30 passes through the sleeves 20, the extending direction of the first protruding parts 22 may be perpendicular to a forward direction of the electrode plate 30. A direction of the force exerted by the first protruding parts 22 on the electrode plate 30 may be the same as a direction of movement of the electrode plate 30, so that it can avoid the offset phenomenon of the electrode plate 30.

Figure 9:
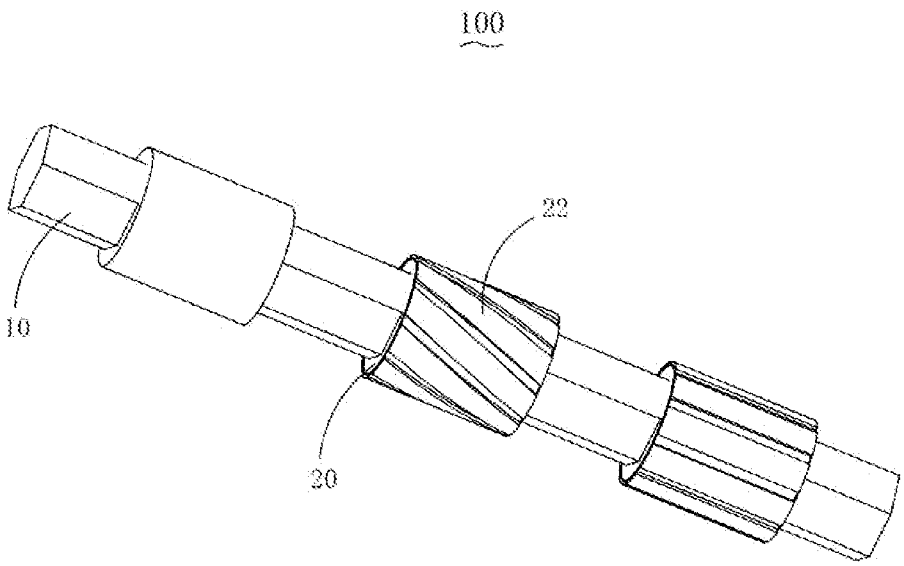
FIG. 9 shows a structural schematic view of a flattening device according to some other embodiments of the present application.

FIG. 9 shows a structural schematic view of the flattening device 100 according to some other embodiments of the present application. An extending direction of the first protruding part 22 is inclined relative to the axial direction.

If there is a difference in height between two sides of the electrode plate 30 in a width direction thereof due to assembly reasons, or if thicknesses of the film-coating region 31 of the electrode plate 30 are inconsistent, it will lead to the offset phenomenon during the electrode plate 30 moving. For example, the right side of electrode plate 30 is higher than the left side of electrode plate 30. The phenomenon of path deviation to the left occurs during the transmission process of the electrode plate 30. However, by using the sleeves 20 with the first protruding part 22 axially inclined relative to the main roller 10, the first protruding part 22 can rotate clockwise at a certain angle relative to the axial direction. When the electrode plate 30 passes through the flattening device 100, the first protruding part 22 can drive the electrode plate 30 to offset to the right, so that the electrode plate 30 can move forward in the predetermined direction. An inclined direction of the first protruding part 22 can be determined arbitrarily, that is, the first protruding part 22 can rotate clockwise at a certain angle relative to the axial direction of the main roller 10 or counterclockwise at a certain angle relative to the axial direction of the main roller 10. Different inclined directions can achieve correction effects in different directions.

The sleeves 20 with the first protruding part 22 whose extending direction is inclined relative to the axial direction of the main roller 10 can not only increase the fraction force between the sleeves 20 and the electrode plate 30 to achieve the wrinkle-removing effect and the flattening effect, but also achieve a certain deflection-correcting effect on the electrode plate 30, so that the electrode plate 30 can move in a predetermined direction.

In some embodiments, an inclined angle of the extending direction of the first protruding part 22 relative to the axial direction is in a range of 1°-80°.

If the inclined angle of the extending direction of the first protruding part 22 relative to the axial direction of the main roller 10 is too small, the deflection-correcting effect may not be obvious; if the inclined angle of the extending direction of the first protruding part 22 relative to the axial direction of the main roller 10 is too large, the excessive deflection-correcting effect may occur. Therefore, the inclined angle can be selected from 1° to 80°, so that it not only can ensure the deflection-correcting effect on the electrode plate 30 that has moved and offset, but also can avoid the phenomenon that the electrode plate 30 offsets again due to the excessive deflection-correcting effect.

In some other embodiments, the first protruding part 22 can also be arranged around the circumference of the main roller 10. In other words, the inclined angle of the first protruding part 22 relative to the axial direction of the main roller 10 may be 90 degrees, so that it can increase the frictional force between the first protruding part 22 and the electrode plate 30 and improve the wrinkle-removing effect.

Figure 10:
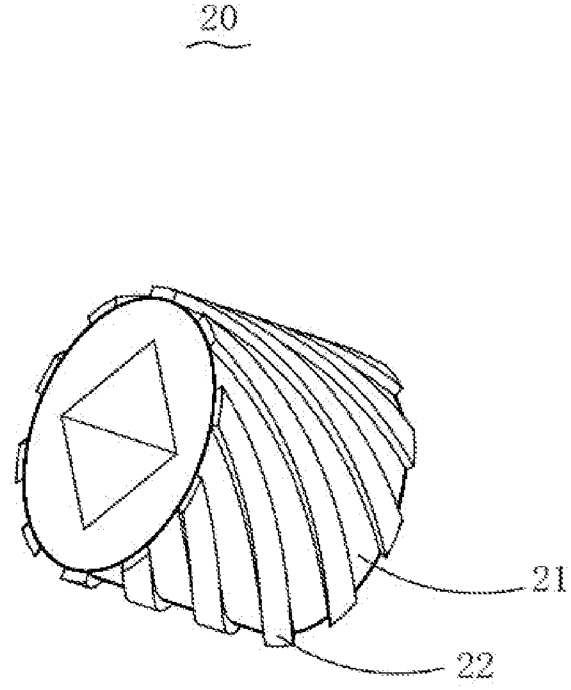
FIG. 10 shows a structural schematic view of a sleeve according to some other embodiments of the present application.
Figure 11:
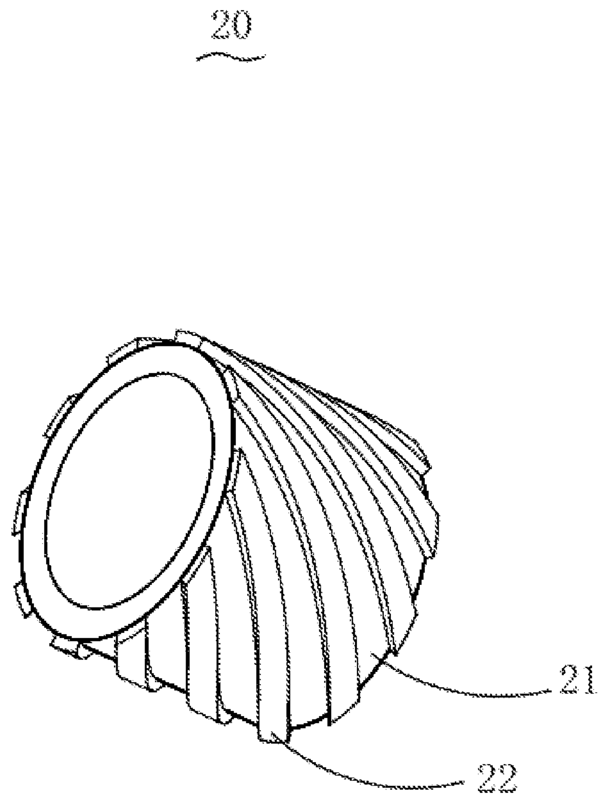
FIG. 11 shows a structural schematic view of a sleeve according to some other embodiments of the present application.

Referring to FIG. 10 and FIG. 11, both of FIG. 10 and FIG. 11 respectively show structural schematic views of the sleeves 20 according to some other embodiments of the present application. The first protruding part 22 can extend in a spiral shape. It should be noted that the spiral shape as mentioned above can be a partial spiral structure (i.e. a section of a complete spiral structure) or a complete spiral structure wrapped around the outer circumferential side of the sleeve main body 21.

The first protruding part 22 in the spiral shape can also provide the direction guidance for the electrode plate 30, so that it can achieve the deviation-correcting effect.

Figure 12:
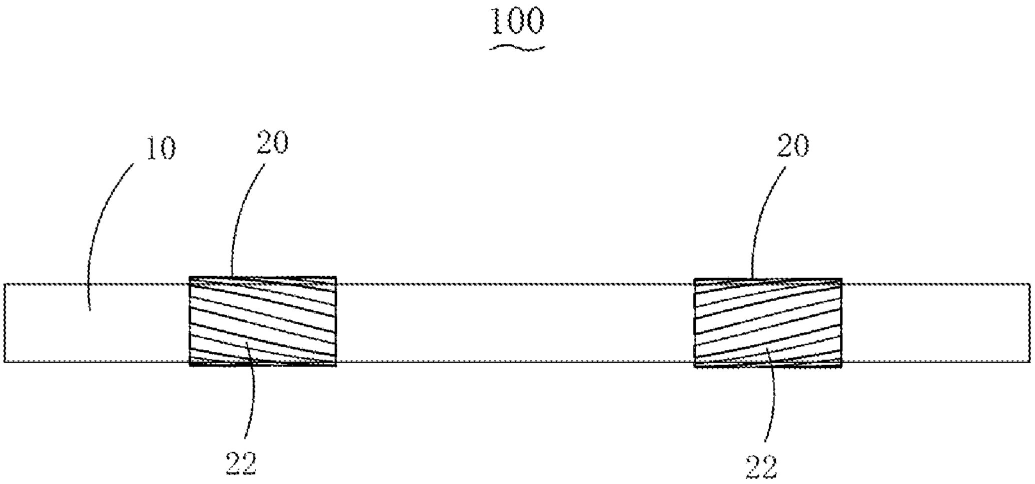
FIG. 12 shows a structural schematic view of a flattening device according to some other embodiments of the present application.

FIG. 12 shows a structural schematic view of the flattening device 100 according to some other embodiments of the present application. The flattening device 100 may include two sleeves 20. The extending directions of the first protruding parts 22 of the two sleeves 20 could be arranged at an angle, and the two sleeves 20 could be symmetrically sleeved on the main roller 10.

If there is no offset phenomenon to the electrode plate 30, and the sleeve 20 with the first protruding part 22 which inclinedly extends is sleeved on the main roller 10, it will cause the electrode plate 30 to offset in a certain direction. However, if the sleeve 20 with the first protruding parts 22 having an opposite inclined direction is symmetrically sleeved on the main roller 10, it can avoid the offset phenomenon of electrode plate 30. For example, if the sleeve 20 with first protruding part 22 having a 30° inclined angle is sleeved on one side of the main roller 10, the sleeve 20 with first protruding part 22 having a −30° inclined angle can be sleeved at a symmetrical position at the other side of the main roller 10.

The inclined directions of the first protruding parts 22 of the two sleeves 20 may be opposite to each other, and the forces exerted by the first protruding parts 22 of the two sleeves 20 on the electrode plate 30 may be exactly opposite to each other, so that it can prevent the electrode plate 30 from offsetting during movement and cause the electrode plate 30 to move in the predetermined direction.

Figure 13:
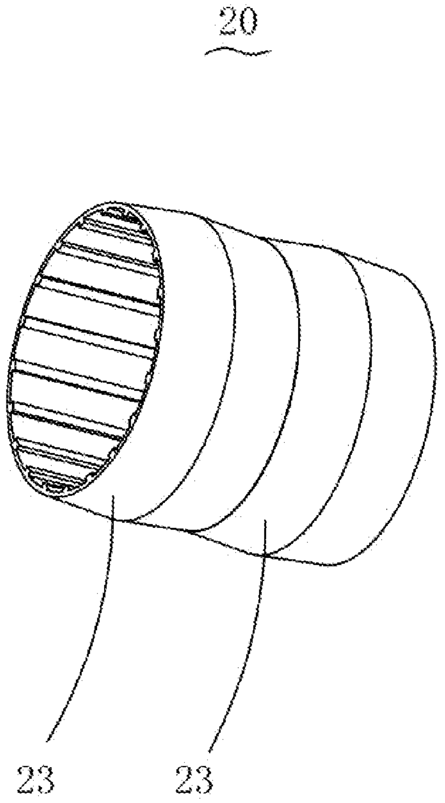
FIG. 13 shows a structural schematic view of a sleeve according to some other embodiments of the present application.

FIG. 13 shows a structural schematic view of the sleeve 20 according to some other embodiments of the present application. At least one of the sleeves 20 may include at least two arc segments 23 sequentially distributed in the axial direction, the at least two arc segments 23 are protruded, and an outer surface of each of the arc segments 23 may be an arc surface with the same curvature.

The arc segments 23 may be arranged at intervals or arranged continuously. The arc segments 23 could protrude outward. The plurality of arc segments 23 protruding outward can increase the friction force between the sleeves 20 and the electrode plate 30, thereby improving the flattening effect.

Figure 14:
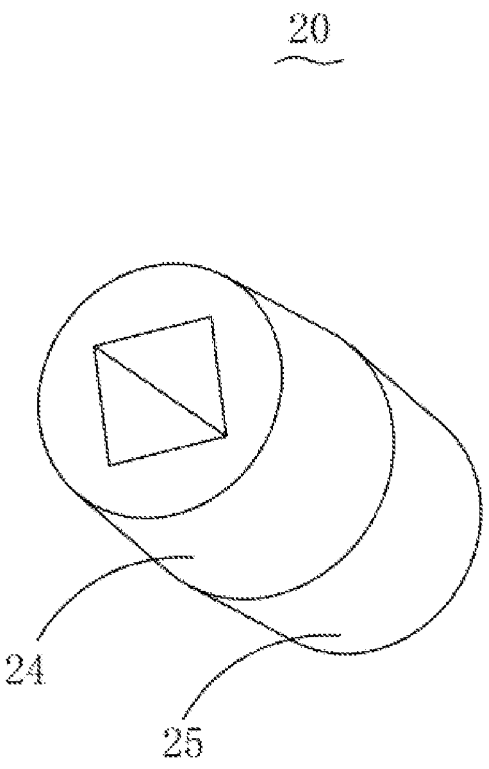
FIG. 14 shows a structural schematic view of a sleeve according to some other embodiments of the present application.
Figure 15:
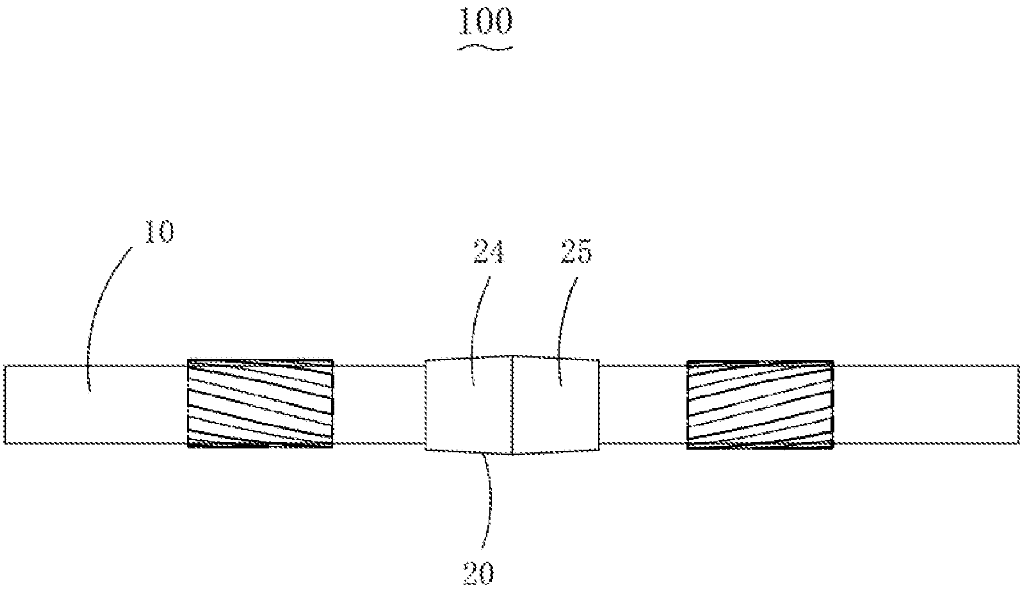
FIG. 15 shows a structural schematic view of a flattening device according to some other embodiments of the present application.

Referring to FIG. 14 and FIG. 15 in conjunction, FIG. 14 shows a structural schematic view of the sleeve 20 according to some other embodiments of the present application; FIG. 15 shows a structural schematic view of the flattening device 100 according to some other embodiments of the present application. At least one of the sleeves 20 may include a first segment 24 and a second segment 25 sequentially distributed in the axial direction, the first segment 24 and the second segment 25 are arranged to gradually expand toward directions close to each other respectively, and the sleeves 20 are sleeved on a middle region of the main roller 10.

An outer diameter of the first segment 24 gradually decreases in a direction away from the second segment 25, and an outer diameter of the second segment 25 gradually decreases in a direction away from the first segment 24. Each of the outer surfaces of the first segment 24 and the second segment 25 can be arranged as the arc surface, so as to fit the electrode plate 30 more closely and facilitate contact with the electrode plate 30 to achieve the wrinkle-removing effect.

Since the electrode plate is relatively thin, during the movement of the electrode plate, the electrode plate is generally in a state that is high on two sides and depressed downward in the middle during the movement of the electrode plate, so that it is prone to wrinkle. The sleeves can be arranged in the middle region of the main roller, corresponding to the region depressed downward in the middle of the electrode plate. Since at least one of the sleeves may be in a shape which is high in the middle and low at two ends, the sleeves can lift up a depressed portion of the electrode plate, so as to prevent the electrode plate from wrinkling.

In some embodiments, the sleeves 20 may be elastic sleeves 20. The elastic sleeve 20 may be made of the elastic material, such as rubber, elastic polymers or the like. In some other embodiments, the sleeves 20 can also be made of the rigid material such as stainless steel, aluminum or the like. The friction forces between the sleeves 20 with different materials and the electrode plates 30 with different materials may be different, so the sleeves 20 with different materials can be selected for removing the wrinkle based on the wrinkling situation of the electrode plate 30.

The elastic sleeves 20 not only have the advantage of light weight, but also have a certain degree of flexibility, so that it can protect the electrode plate 30 and prevent the electrode plate 30 from being damaged. In addition, the friction force of the elastic sleeves 20 is relatively large, so that it can improve the wrinkle-removing effect.

Figure 16:
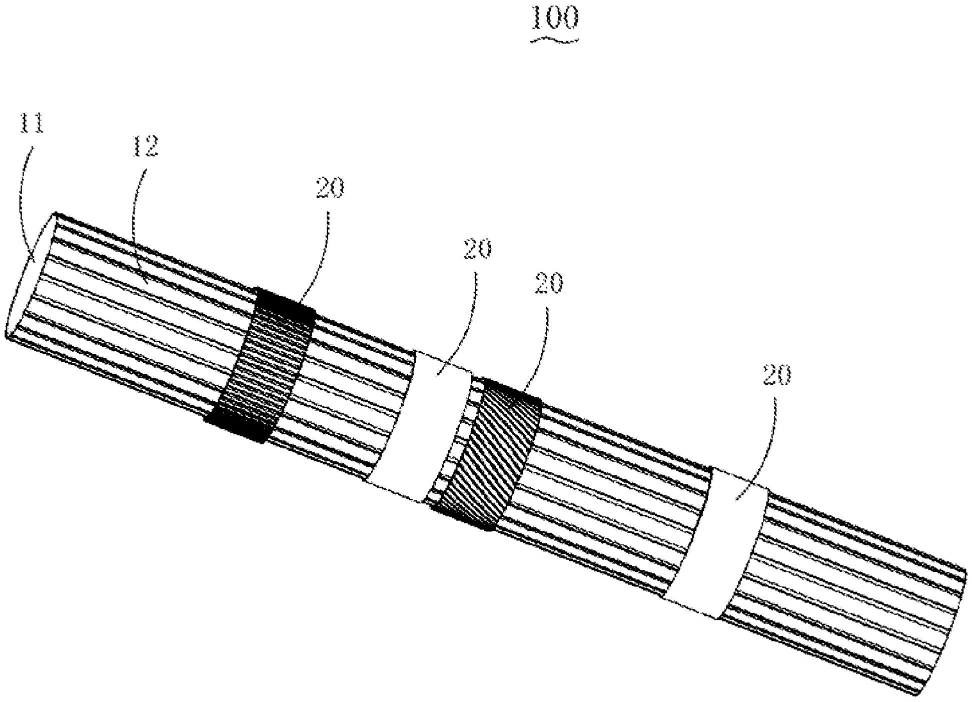
FIG. 16 shows a structural schematic view of a flattening device according to some other embodiments of the present application.
Figure 17:
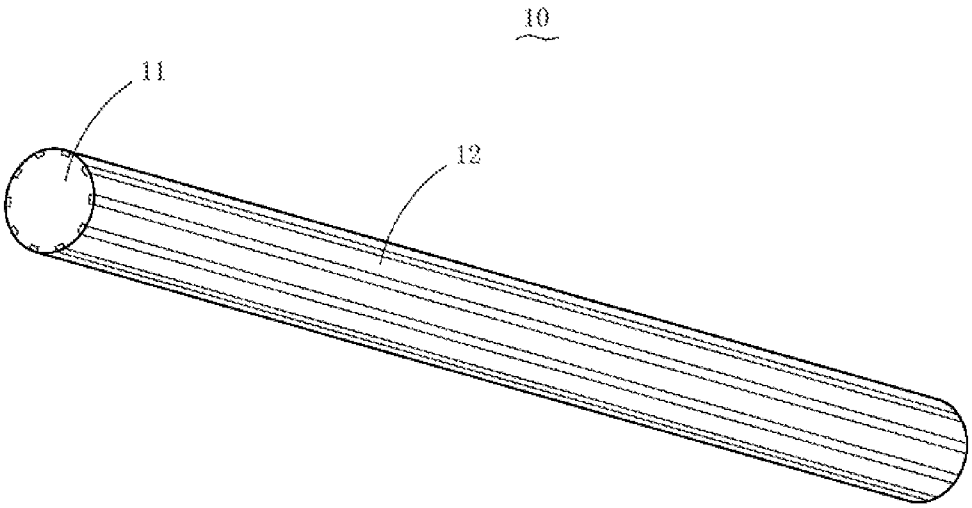
FIG. 17 shows a structural schematic view of a main roller according to some other embodiments of the present application.
Figure 18:
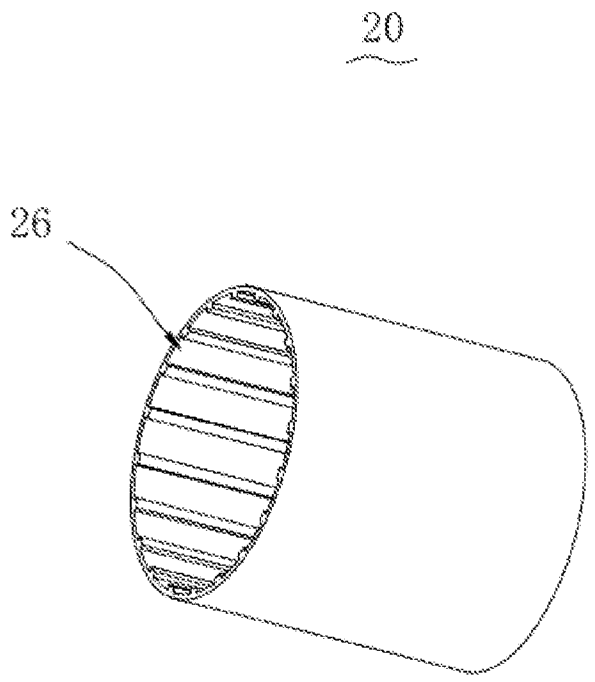
FIG. 18 shows a structural schematic view of a sleeve according to some other embodiments of the present application.

Referring to FIG. 16 to FIG. 18 in conjunction, FIG. 16 shows a structural schematic view of the flattening device 100 according to some other embodiments of the present application; FIG. 17 shows a structural schematic view of the main roller 10 according to some other embodiments of the present application; and FIG. 18 shows a structural schematic view of the sleeve 20 according to some other embodiments of the present application. In some embodiments, the main roller 10 may include a roller body 11 and a plurality of second protruding parts 12, each of the second protruding parts 12 may protrude from an outer surface of the roller body 11, and an inner surface of at least one of the sleeves 20 may be provided with grooves 26 engaged with the second protruding parts 12.

When the main roller 10 is a circular or curved roller, the main roller 10 can be used alone to remove the wrinkle and flatten the electrode plate 30. The plurality of second protruding parts 12 can be arranged on the outer surface of the roller body 11 to increase the friction force between the main roller 10 and the electrode plate 30, thereby improving the wrinkle-removing effect. Each of the second protruding parts 12 may be a point-shaped convex structure or a long strip-shaped convex rib structure. A portion of the outer surface of the sleeve main body 21 may be arranged as a convex curved surface to form the second protruding part 12, or the outer surface of the sleeves 20 may be arranged as a concave dent to form the second protruding part 12. The structure and shape of the second protruding part 12 can be determined according to the first protruding part 22 in the above embodiments, and will not be repeated here. When the second protruding part 12 extends in the axial direction of the main roller 10, the groove 26 can also be arranged to extend in the axial direction of the main roller 10. The sleeves 20 can slide along the second protruding part 12 relative to the main roller 10 to change the position of the second protruding part 12 on the main roller 10.

Since the length of the main roller 10 is relatively long, the main roller 10 can be used to simultaneously remove the wrinkle from the film-coating region 31 of the entire electrode plate 30. By the engagement cooperation between the second protruding part 12 and the groove 26, the sleeves 20 can be sleeved on the outer surface of the main roller 10, and the sleeves 20 can slide relative to the main roller to realize the position adjustment of the sleeves 20.

In some embodiments, the flattening device 100 may further include an expansion structure arranged between the main roller 10 and the sleeves 20. The main roller 10 can be detachably connected to the sleeves 20 through the expansion structure.

The expansion structure can be arranged on an outer wall face of the main roller 10 or on an inner wall face of the sleeves 20. The expansion structure can be a gas-expansion structure. When the gas-expansion structure is arranged on the inner wall face of the main roller 10, the main roller 10 can be regarded as a gas-expansion rotating axis. That is to say, an inflatable tightening part can be arranged on the outer surface of the main roller 10. When air is injected into the expansion structure, the expansion structure expands and tightly binds to the inner surfaces of the sleeves 20, so that the sleeve 20 can be accurately fixed on the main roller 10; when the air is released, the expanded part contracts, and the sleeves 20 can be removed from the main roller 10.

The expansion structure can also be a liquid-expansion structure. The liquid can be injected into the expansion structure to expand the expansion structure. When the liquid-expansion structure is arranged on the inner wall face of the main roller 10, the main roller 10 can be regarded as a liquid-expansion rotating axis. Similar to the principle of gas-expansion structure, the specific working principle of liquid-expansion structure can refer to the gas-expansion structure thereof, and will not be repeated here. In some other embodiments, the detachable fixation of the sleeves 20 and the main roller 10 can also be achieved through the screw, clamping and other means.

The sleeves 20 can be tightly sleeved on the main roller 10 through the expansion of the expansion structure. When it is needed to adjust the position of the sleeves 20 or disassemble the sleeves 20, only the pressure relief of the expansion structure is needed to form a gap between the sleeves 20 and the main roller 10, and the sleeves 20 and the main roller 10 can be separated from each other.

According to some embodiments of the present application, the flattening device 100 provided by embodiments of the present application may include a main roller 10 and a plurality of sleeves 20. The plurality of sleeves 20 are sleeved on the main roller 10 at intervals in an axial direction of the main roller 10. At least one of the sleeves 20 is detachably connected to the main roller 10, so that positions of the sleeves 20 in the axial direction of the main roller 10 are adjustable, and the sleeves 20 are in contact with the electrode plate 30 to flatten the electrode plate 30 when the electrode plate 30 passes through the sleeves 20. By detachably connecting the sleeve 20 with the main roller 10, the main roller 10 can be used separately to flatten the electrode plate 30, or the sleeve 20 can be sleeved on the main roller 10 to flatten the electrode plate 30. The sleeve 20 can flatten both the film-coating region 31 and the blank region 32. On the other hand, the position of the sleeve 20 in the axial direction of the main roller 10 can be adjusted, and the plurality of sleeves 20 can be sleeved at intervals in the axial direction of the main roller 10, the sleeves 20 can be applied to the electrode 30 with the plurality of blank regions 32 and the plurality of film-coating regions 31, and at the same time can flatten the plurality of film-coating regions 31 or blank regions 32. Since the distance between any two sleeves 20 can be adjusted, the distance between sleeves 20 can be adjusted according to the width between the blank regions 32 or the film-coating regions 31, so as to flatten different types of electrode plates 30, thereby improving the compatibility of the flattening device 100. At least two sleeves 20 have different axial dimensions; and/or at least two sleeves 20 have different surface patterns. The sleeve 20 with a corresponding length size can be selected based on the specific width of the film-coating region 31 or the blank region 32. Different patterns can correspond to different wrinkle situations. The patterns on the outer surfaces of at least two sleeves 20 are arranged to be different, so that it can flatten the electrode plates 30 in the different wrinkled situations.

Although the present application has been described with reference to the embodiments, various improvements can be made and components can be replaced with equivalents without departing from the scope of the present application. Especially, as long as there is no structural conflict, the various technical features mentioned in each of the embodiments can be combined in any way. The present application is not limited to the specific embodiments disclosed in the text, but includes all technical solutions falling within the scope of the claims.

What is claimed is:

1. A flattening device for flattening an electrode plate, comprising:
- a main roller; and
- a plurality of sleeves, sleeved on the main roller and arranged at intervals in an axial direction of the main roller;
- wherein:
  - the sleeves are detachably connected to the main roller, so that positions of the sleeves in the axial direction of the main roller are adjustable;
  - the sleeves are in contact with the electrode plate to flatten the electrode plate when the electrode plate passes through the sleeves;
  - at least two of the sleeves have different dimensions in the axial direction and/or at least two of the sleeves have different surface patterns;
  - the main roller comprises a roller body and a plurality of protruding parts, each of the protruding parts protrudes from an outer surface of the roller body;
  - each of the plurality of protruding parts is a long strip-shaped convex rib structure extending in the axial direction of the main roller, an axis of the long strip-shaped convex rib structure being parallel to the axis of the main roller; and
  - an inner surface of at least one of the sleeves is provided with grooves engaged with the plurality of protruding parts, the grooves extend in the axial direction of the main roller.

2. The flattening device according to claim 1, wherein;
the plurality of protruding parts are a plurality of first protruding parts; and
the at least one of the sleeves comprises two sleeves each comprising a sleeve main body and a second protruding part, wherein extending directions of the second protruding parts of the two sleeves are arranged at an angle between each other, and the two sleeves are symmetrically sleeved on the main roller.

3. The flattening device according to claim 1, wherein at least one of the sleeves comprises at least two arc segments sequentially distributed in the axial direction, the at least two arc segments are protruded, and an outer surface of each of the arc segments is an arc surface with the same curvature.

4. The flattening device according to claim 1, wherein at least one of the sleeves comprises a first segment and a second segment sequentially distributed in the axial direction, the first segment and the second segment are arranged to gradually expand in directions close to each other respectively, and the sleeves are sleeved on a middle region of the main roller.

5. The flattening device according to claim 1, wherein the sleeves are elastic sleeves.

6. The flattening device according to claim 1, wherein the main roller is a prism roller.

7. The flattening device according to claim 1, wherein:
the plurality of protruding parts are a plurality of first protruding parts; and
at least one of the sleeves comprises a sleeve main body and a second protruding part, the sleeve main body is sleeved on the main roller and detachably connected to the main roller, and the second protruding part protrudes from an outer surface of the sleeve main body.

8. The flattening device according to claim 7, wherein the second protruding part is one of a plurality of second protruding parts provided at the at least one of the sleeves, and the plurality of second protruding parts are arranged at intervals in a circumferential direction of the sleeve main body.

9. The flattening device according to claim 7, wherein the second protruding part extends in the axial direction.

10. The flattening device according to claim 7, wherein the second protruding part extends in a spiral shape.

11. The flattening device according to claim 7, wherein an extending direction of the second protruding part is inclined relative to the axial direction.

12. The flattening device according to claim 11, wherein an inclined angle of the extending direction of the second protruding part relative to the axial direction is in a range of 1°-80°.

13. A flattening device for flattening an electrode plate, comprising:
a main roller, wherein the main roller is a prism roller; and
a plurality of sleeves, sleeved on the main roller and arranged at intervals in an axial direction of the main roller;
wherein:
the sleeves are detachably connected to the main roller, so that positions of the sleeves in the axial direction of the main roller are adjustable;
the sleeves are in contact with the electrode plate to flatten the electrode plate when the electrode plate passes through the sleeves; and
at least two of the sleeves have different dimensions in the axial direction and/or at least two of the sleeves have different surface patterns.

* * * * *